Dec. 1, 1964   W. A. SCHUMBACKER ETAL   3,159,106
IMPELLER AND METHOD OF MAKING SAME
Filed March 21, 1962
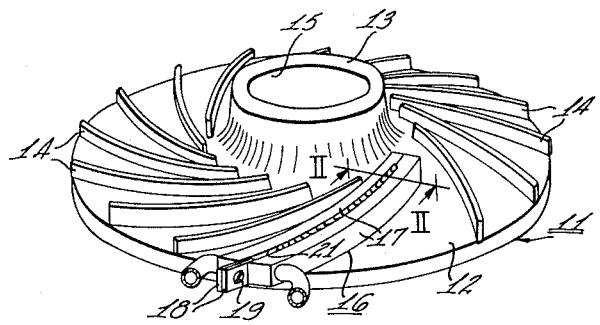
Fig.-1
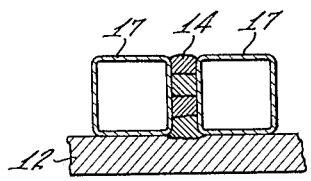
Fig.2
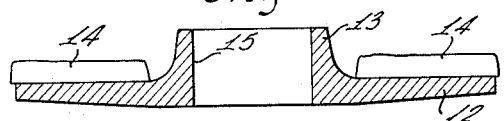
Fig.3
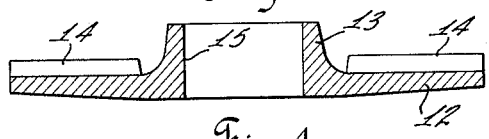
Fig.4
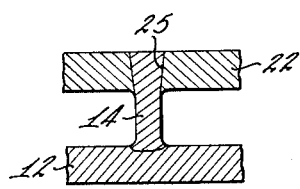
Fig.7
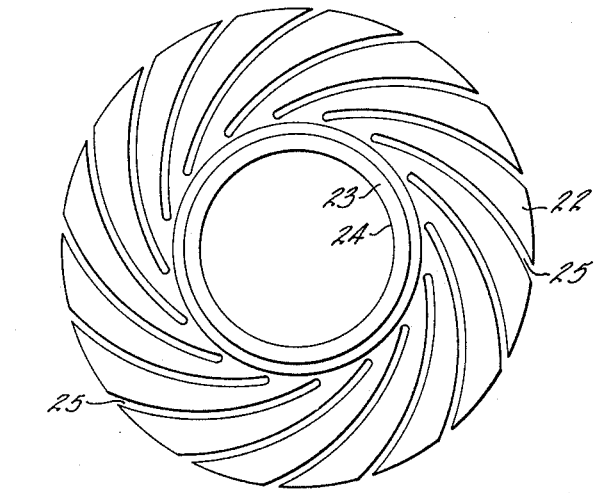
Fig.5
Fig.6
Inventors
Willard A. Schumbacker
Edward Soref
by John P. Hines
Attorney

United States Patent Office 3,159,106
Patented Dec. 1, 1964

3,159,106
IMPELLER AND METHOD OF MAKING SAME
Willerd A. Schumbacker, West Allis, and Edward Soref, Milwaukee, Wis., assignors to Allis-Chalmers Manufacturing Company, Milwaukee, Wis.
Filed Mar. 21, 1962, Ser. No. 181,420
3 Claims. (Cl. 103—115)

This invention pertains to impellers and more particularly to welded type impellers and the method of making same.

Although the invention has application to any type of revolving impeller, it is particularly applicable to narrow closed type pump impellers. A closed type impeller as used herein is composed of two disks connected together as a unitary structure by curved impeller vanes. The fluid enters through the center of one disk and flows outwardly through the passages defined by adjacent vanes.

It is more desirable from an economic and efficiency standpoint to revolve a single impeller at a high speed to deliver a required volume of fluid at a particular pressure than to revolve a multiple of impellers at a slower speed to acquire the same pressure and volume of fluid. The slower speed machine would require more horsepower because of its greater weight and would be more expensive to manufacture due to the added material and the time involved to manufacture it. As the speed of the impeller is increased, the number of stages required to develop the necessary pressure is reduced and also the size of the fluid passageways can be decreased as the higher speed impeller will deliver a large volume of fluid than will the same impeller rotating at a slower speed. Since the rotational speed of a large heavy impeller is limited by the centrifugal force set up, it would seem that the natural line of development in machines for pressurizing a fluid would be to light weight high speed impellers.

This has been the case; however, certain problems have developed. In the past, impellers had been fabricated by welding the hub and cover disks to the impeller vanes. However, as the height of the vanes, that is, the spacing between the impeller disks, has decreased, it has become exceedingly difficult to effect a satisfactory welded joint between the disks and the vanes. It is an easy matter to weld the vanes to one disk, however, when the other disk is welded to the other side of the vanes, there is not sufficient room for the welding equipment to fit between the disks and the vanes. This can be readily appreciated when it is understood that impellers having a width of one inch or less have been used.

To overcome this difficulty of welding the impeller it has become the practice to rivet the last assembled disk to the impeller vanes. Riveting in most cases is a more expensive manufacturing procedure than is welding and, furthermore, it is generally accepted that a welded joint is considerably stronger than a riveted joint. It can, therefore, be seen that a light weight riveted impeller cannot be rotated at as high a speed as can a light welded impeller because of the centrifugal forces involved.

With the ever present desire to manufacture a strong light weight impeller which can be rotated at high speeds, efforts have been made to develop automatic welding machines which would be capable of welding narrow impellers. However, applicants are not aware of the success of any of these efforts and do not know of any automatic machine which is capable of welding narrow impellers.

Applicants have developed a closed type impeller and the method of making same wherein the final impeller is a welded unitary structure of exceedingly high strength and the method employed permits fabricating impellers as narrow as one-fourth inch in width.

It is, therefore, a general object of the subject invention to provide a welded impeller wherein the impeller vanes are connected to the disks in a manner which permits full penetration of the weld between the vanes and the disks.

A further object of the subject invention is to provide an impeller of the hereinbefore described type which is relatively simple to fabricate and which is inexpensive to manufacture.

An additional object of the subject invention is to provide an impeller wherein the impeller vanes are composed of weld material built up on one of the impeller disks.

A further object of the subject invention is to provide a method of efficiently fabricating an impeller by building up weld beads on the impeller disk to form the impeller vanes.

These and other objects of the subject invention will become more fully apparent as the following description is read in light of the attached drawing, wherein:

FIG. 1 is an isometric view showing a number of impeller vanes being formed on the hub disk of the impeller;

FIG. 2 is a cross sectional view taken along the lines II—II of FIG. 1;

FIG. 3 is a cross sectional view of the hub disk and vanes of the impeller before they are machined to the finished dimension;

FIG. 4 is a cross sectional view similar to FIG. 3 showing the impeller vanes after they have been machined to the finished dimension;

FIG. 5 is a plan view of the cover disk having slots therein to receive the impeller vanes;

FIG. 6 is a cross sectional view of the impeller after the cover disk has been welded to the impeller vanes; and FIG. 7 is a cross sectional view taken along the lines VII—VII of FIG. 6.

Referring to the drawing, and particularly FIGS. 1 and 2, the invention is shown in relation to a closed type centrifugal impeller having a hub disk generally designated 11. The hub disk 11 is composed of a circular flat portion 12 and a raised hub portion 13. The hub 13 has a bore 15 therethrough in which is received a shaft of a machine (not shown) which drives the impeller. FIG. 1 shows a number of vanes 14 attached to the flat portion 12 of the hub disk and, furthermore, shows a mold generally designated 16. The mold 16 may be constructed in any conventional manner and is herein shown as a unitary structure having two elongated leg portions 17 connected together at one end and provided with flanges 18 connected to each leg at the other end thereof. The flanges 18 have an opening therethrough through which is received a bolt 19 to rigidly connect the two legs 17 of the mold. The mold is so constructed that when the legs are fastened together, a slot 21 is provided therebetween which slot is identical to the width of the vanes 14 and is of a configuration to conform to the desired curved shape of the vanes.

The depth of the mold 16 must be at least equal to the desired height of the vanes 14. However, it is preferred that it be slightly deeper so that after the vanes have been formed in the mold there is sufficient material to permit machining of the vanes to the desired finished dimension. As shown in FIG. 2, the legs 17 of the mold are hollow to permit cooling water to be circulated therethrough. It is also necessary that the mold be constructed of a material which will not permit the adherence thereto of the weld material or they must be coated with a substance which will not permit adherence of the weld material.

Referring to FIG. 5, the cover disk may be provided with a hub 23 having an opening 24 therethrough which is slightly larger in diameter than the outside diameter of the hub 13. The cover disk 22 is also provided with a plurality of through slots 25 which are equal in number to and are identical in shape to the vanes 14. The width of the slots 25 is preferably slightly larger than the width of the vanes.

Any number of procedures may be followed to accurately position the mold 16 on a disk. If the position of each vane is scribed on the disk, it is possible to use more than a single mold so that one mold can be used while the other mold or molds are cooling. If a single mold is used, it may be provided with a spacer which, when the spacer is in contact with a previous vane, will accurately position the mold for building up the next vane.

Once the mold is positioned in the desired location for the vane, the weld material is flowed into the mold. Although it is not absolutely necessary, it is desirable to build the vane up by laying individual weld beads on top of one another until the desired height of the vane has been achieved. This is shown in FIG. 2. Since the vane is constructed of weld material, it can be seen that a complete weld is effected between the disk and the vane thereby resulting in an extremely strong joint. Since the configuration and area of the weld determine the strength of the joint, it is obvious that this type of vane will be stronger than a vane of rectangular cross section which is fillet welded to the disk. This is because the fillet weld does not completely penetrate both the disk and the vane and the resultant joint is more susceptible to stress concentration.

After all of the vanes have been built up on the hub disk, they are machined to the desired dimension as shown in FIG. 4. The cover disk with the slots 25 therein is then accurately positioned on the vanes which are now integral with the hub disk. A mold is then placed under the cover disk against each side of a vane. This is done to eliminate a notch effect and also to create a 100 percent weld deposit. Weld material is then flowed into the slots 25 to complete the connection between the cover disk and the vanes. The resultant structure is extremely strong and rigid due to the full contact of the weld joints between the vanes and the two disks. The weld joints between the two disks and the vanes is shown in FIG. 7, and it can be seen that a very strong connection is effected.

By actually constructing the vanes of weld material applicants have developed an impeller which is exceedingly strong and can, therefore, be rotated at a high speed. Furthermore, because of the novel method of constructing the impeller, a very narrow impeller can be economically welded together.

Although but a single embodiment of the subject invention has been illustrated and described, it will be apparent to those skilled in the art that various changes and modifications may be made therein without departing from the spirit of the invention or from the scope of the appended claims.

Having now particularly described and ascertained the nature of our said invention and the manner in which it is to be performed, we declare that what we claim is:

1. An impeller comprising: a first disk; a second disk; and a plurality of spaced vanes composed entirely of weld material fused to said disks to rigidly hold same in spaced apart relation.

2. An impeller comprising: a first disk; a second disk; a plurality of spaced vanes composed entirely of weld material fused to said disks to rigidly hold same in spaced apart relation, the inner ends of said vanes defining an annulus; and walls defining an opening through the central portion of one of said disks in communication with said annulus.

3. An impeller comprising: a first disk having a centrally located hub thereon and a shaft bore in said hub; a second disk having a centrally located opening therethrough, said opening having a diameter larger than the outside diameter of said hub; and a plurality of spaced vanes composed entirely of weld material fused to said disks to hold same in spaced apart relation, the inner ends of said vanes defining an annulus in communication with an annular opening defined by said opening and said hub.

References Cited in the file of this patent
UNITED STATES PATENTS

| | | |
|---|---|---|
| 1,755,321 | Hendrickson | Apr. 22, 1930 |
| 1,953,064 | Dawson | Apr. 3, 1934 |
| 1,990,069 | Gordon | Feb. 5, 1935 |
| 2,219,352 | Andrus | Oct. 29, 1940 |
| 2,247,813 | Huitson | July 1, 1941 |
| 2,250,561 | Wissler | July 29, 1941 |
| 2,598,027 | Weir et al. | May 27, 1952 |
| 2,654,943 | Campbell | Oct. 13, 1953 |
| 2,807,871 | Wagner et al. | Oct. 1, 1957 |
| 3,074,151 | Kroeckel | Jan. 22, 1963 |

FOREIGN PATENTS

| | | |
|---|---|---|
| 616,811 | Germany | Aug. 5, 1955 |
| 632,475 | Great Britain | Nov. 28, 1949 |
| 674,399 | Great Britain | June 25, 1952 |

OTHER REFERENCES

The Linde Air Products Co., "Oxy-Acetylene," October 1943, pages 133–135.